United States Patent Office 2,919,268
Patented Dec. 29, 1959

2,919,268

CATALYST OF ALKALINE EARTH METAL HYDRIDE AND A METAL OXIDE AND POLYMERIZATION THEREBY

Peter Fotis, Jr., Highland, Ind., Donald L. Esmay, Coon Rapids, Minn., and Philip Hill, Lansing, Ill., assignors to Standard Oil Company, Chicago, Ill., a corporation of Indiana No Drawing. Application April 25, 1958
Serial No. 730,828

6 Claims. (Cl. 260—94.9)

This invention relates to novel catalysts and processes in which said catalysts are used for polymerization of normally gaseous olefins, especially normally gaseous normal alkenes containing 2 to 4 carbon atoms, inclusive, in the molecule in order to produce high molecular weight polymers, specifically resinous polymers softening usually at temperatures well above 100° C.

One object of our invention is to provide novel and useful catalysts for the conversion of normally gaseous olefins to high molecular weight polymers. Another object is to provide novel processes for the preparation of novel polymerization catalysts. Yet another object is to provide catalytic processes for the conversion of ethylene, propylene, 1-butene or their mixtures to resinous polymers of predominantly linear structure, relatively high crystallinity and density, and relatively low permeability to moisture and/or other vapor and gases. These and other objects of our invention will become apparent from the ensuing description thereof.

Briefly, we have discovered that novel olefin polymerization catalysts can be readily prepared by heating mixtures consisting essentially of an alkaline earth metal hydride and a metal oxide having a surface area in the range of about 50 to 500 square meters per gram (or even high specific areas) selected from the class consisting of magnesia, titania, zirconia, alumina or mixtures thereof. The surface area of the metal oxide components of our catalysts is determined by the method of Brunauer, Emmett and Teller (J. Am. Chem. Soc. 60, 309+ (1938); so-called BET method).

The metal oxides in dry, calcined form are non-acidic or essentially neutral, whereas silica-alumina or alumina-silicates are acidic, as can be determined by adsorption of a free indicator base in a neutral non-aqueous medium (note, e.g. Cheves Walling, "The Acid Strength of Surfaces," J. Am. Chem. Soc. 72, 1164–8 (March 1950)).

The weight ratio of the alkaline earth metal hydride such as calcium hydride to the metal oxide such as (gamma) alumina is selected within the range of about 0.15 to about 1. The catalyst components are heated to a high activation temperature within the range of about 500° C. to about 700° C. in an inert (non-oxidizing, non-hydrolyzing) atmosphere, i.e., in an inert gas or high vacuum. Hydrogen, in low concentrations, is in equilibrium with the alkaline earth metal hydrides under the conditions of catalyst preparation but is considered an inert atmosphere for our purposes. The catalyst components are preferably powdered to a size below about 200 mesh per inch and are stirred mechanically or by an inert gas to effect intimate contacting. Contacting is continued for a period of time sufficient to obtain an active polymerization catalyst; in general, longer times are required at lower temperatures under otherwise constant operating conditions. Contacting periods in the range of 1 to 20 hours may be used for catalyst preparation. Suitable inert gases are helium, neon, argon or the like, nitrogen, etc. Partial pressures of the order of 760 mm. of mercury down to $10^{-3}$ mm. of mercury or even less may be imposed over the ingredients being contacted to form the polymerization catalyst.

The catalysts of our invention can be employed in various forms and sizes, e.g. as a powder, granules, lumps, etc. The catalyst powder can be shaped into pellets by suitable techniques in an inert atmosphere. We have found that the catalyst can be readily employed as granules having a size of more than about 200 mesh per inch, for example, between about 20 to 100 mesh per inch, in the polymerization of ethylene in the presence of an inert liquid medium. Powdered catalysts are likewise desirable for use in processes for the polymerization of gaseous n-alkenes in the gas phase with a motionalized bed, e.g., a stirred bed, a moving bed or a fluidized bed, all these techniques of contacting powdered solid with gas streams in ethylene polymerization being well known.

It is desirable to minimize or avoid the introduction of oxygen, carbon monoxide, carbon dioxide, water, acetylene, ammonia or sulfur compounds in contact with the catalysts of our invention before or during contact of olefin therewith in the polymerization process.

The feed stock to our polymerization process can comprise any normally gaseous olefin or binary, or even ternary, mixtures of such olefins and is particularly applicable to the individual normally gaseous normal alkenes or their mixtures with each other or with conjugated dienes. Specifically, the polymerization charging stocks can comprise one or more of the following: ethylene, propylene, 1-butene, 1,3-butadiene and even isoprene. Also various co-monomers can be added to the principal olefin or alkene feed stock, for example, tert-butylethylene, styrene, etc.

The polymerization process is ordinarily conducted at temperatures within the range of about 100° C. and about 300° C., although more frequently the range of about 100° C. to about 170° C. is employed. The olefin charging stock can be contacted with the polymerization catalyst in the form of a gas and polymer can thereafter be separated from the catalyst with a selective solvent therefor such as saturated or aromatic hydrocarbons, which preferably contain between about 6 and about 12 carbon atoms per molecule, more often about 6 to 9 carbon atoms per molecule. The polymerization pressure in effect can control the concentration of olefin brought into contact with the polymerization catalyst and as will be apparent, it will depend to some extent on the particular feed stock. In general, the polymerization reactor pressure can be varied from about 15 to about 15,000 p.s.i. or even more. The polymerization of ethylene and/or propylene is usually effected at pressures between about 300 and about 3000 p.s.i., even in the presence of a liquid hydrocarbon reaction medium which serves as the means of contacting the olefin feed stock with the polymerization catalyst.

In order to obtain increased rates of olefin polymerization and to effect continuous removal of at least a fraction of the resinous product from the catalyst during polymerization, it is desirable to effect the polymerization in the presence of inert liquid reaction media, particularly saturated and/or aromatic hydrocarbons which are liquid under the polymerization conditions. Suitable alkanes and cycloalkanes useful as reaction media are n-pentane, isopentane, hexanes, heptanes, n-octane, iso-octane, n-decane, n-dodecane, cyclohexane, methylcyclohexane, saturated naphthas, kerosenes or their mixtures, or the like. Suitable aromatic hydrocarbon liquid media comprise benzene, toluene, xylenes, mesitylene, or their mixtures, or the like. Other liquid hydrocarbon media which are substantially inert in the reaction zone may be employed. Since these are well known in the art of polymerizing olefins in the presence of solid catalysts, there is no need to extend the description thereof herein (note, for example, U.S. Patent 2,731,452 of Edmund Field and Morris Feller, granted January 17, 1956).

The liquid hydrocarbon reaction medium may be present in the polymerization reaction zone in proportions between about 10 and about 98% by weight, based on the weight of both olefin and reaction medium. The concentration of olefin in the liquid reaction medium is preferably between about 2 and about 5% by weight.

The concentration of catalyst with respect to olefin can range upwardly from about 1 percent by weight and is usually of the order of about 10 to about 25 percent by weight in a batch operation in which the catalyst is suspended in a liquid hydrocarbon reaction medium. Intimate contacting of olefin and the catalyst is achieved by suitable agitation.

The contact time or space velocity employed in the polymerization process will be selected with reference to the other process variables, catalysts, the specific type of product desired and the extent of olefin conversion desired in any given run or pass over the catalyst. In general, this variable is readily adjustable to obtain the desired results. In operations in which the olefin charging stock is caused to flow continuously into and out of contact with the solid catalyst, suitable liquid hourly space velocities are usually selected between about 0.1 and about 10 volumes, preferably about 0.5 to 5 or about 2 volumes of olefin solution in the liquid reaction medium.

In batch operations, operating periods of between one-half and about 40 hours, usually between about 2 and about 20 hours, are employed and the reaction autoclave is recharged with olefin intermittently or continuously as the pressure decreases because of olefin polymerization.

The solvent:catalyst weight ratio can be varied in the range of about 5 to about 3000, or even higher for flow systems.

The process of the present invention can be carried out using various techniques already known in the polymerization of olefin with solid catalysts. Thus, the catalyst may be employed as a fluidized bed, a fixed bed, a moving bed or a slurry in the liquid reaction medium. As aforesaid, vapor phase polymerization of olefin may be practiced with the present catalyst but, preferably, the olefin is introduced as a gas into a reactor containing a substantially inert liquid hydrocarbon reaction medium or, in some instances, as a solution in said liquid hydrocarbon reaction medium.

The following examples are offered in order to provide specific illustrations of our invention without the intention of unduly limiting the same. A small, stainless steel vessel equipped wtih a gas inlet and outlet and a stirrer was used for the preparation of the catalysts. The alkaline earth metal hydride was in each case ball-milled to a particle size sufficiently small to pass through a sieve of 200 mesh per inch.

The alumina gel (gamma-alumina) used in some of the examples was prepared from aluminum amalgam according to Reissue 22,196 of U.S. Patent 2,274,634 and was a powder passing through a 200 mesh per inch screen. Its approximate surface area was 350 square meters per gram by the BET method.

The catalyst components were in each instance stirred in the indicated portions at the indicated temperature for the indicated time in a helium atmosphere at atmospheric pressure. The resultant powder was, in each case, allowed to cool to room temperature under an inert gas blanket and was then transferred under said blanket to a stainless steel batch reactor equipped with a magnetic stirrer (250 ml. Magna-Dash reactor) containing 100 ml. of highly purified, dried benzene, which served as the liquid polymerization medium. The contents of the reactor were stirred and heated to 150° C., ethylene was then introduced to a partial pressure of 1200 p.s.i. and polymerization was effected for 18 hours with intermittent introduction of ethylene to maintain a desirable concentration of ethylene in the reactor. After the reaction, the reactor contents were allowed to cool to room temperature and excess gas pressure was vented. The catalyst containing sorbed polymer was filtered from the benzene reaction medium and extracted with xylene, the reaction medium was combined with the exylene extract, and the solute polymer was precipitated by the addition of methanol. The solvent was filtered from the polymer, redistilled and the distillate was analyzed by mass spectrometer, which showed that no benzene alkylation had occurred during the polymerization process. The results shown in the following tables were obtained.

*Table 1*

Catalyst:
  Gamma-$Al_2O_3$ ---------------------------------- gram -- 10
  $CaH_2$ ---------------------------------------- gram -- 2.5

| Run | Catalyst Preparation | | Solid Polyethylenes, g. |
|---|---|---|---|
| | Temp., °C. | Time, hrs. | |
| 1 | 400 | 2 | 0.0 |
| 2 | 550 | 2 | 11.0 |
| 3 | 650 | 2 | 11.0 |

It will be noted from Table 1 that no active catalyst could be produced at 400° C., whereas highly active catalysts were obtained when the catalyst components were brought together at 550 or 650° C.

*Table 2*

| Run | $Al_2O_3$, g. | $CaH_2$ | $CaH_2/Al_2O_3$ (By Wt.) | Solid Polyethylenes, g. |
|---|---|---|---|---|
| 4 | 10 | 1.0 | 0.10 | Trace |
| 2 | 10 | 2.5 | 0.25 | 11.0 |
| 5 | 5 | 2.5 | 0.50 | 8.0 |
| 6 | 2.5 | 2.5 | 1.00 | 0.3 |
| 7 [1] | 10 | 2.5 | 0.25 | 0.0 |
| 8 [2] | 10 | 2.5 | 0.25 | 11.0 |

[1] $CaH_2$ heated without $Al_2O_3$ and thereafter mixed with $Al_2O_3$.
[2] Polymerization at 200° C.

All the catalyst preparations of Table 2 were carried out at 550° C. for 2 hours. It will be noted that no solid polymer was obtained at the weight ratio of 0.1 calcium hydride:alumina and that very good results were obtained at the weight ratios of 0.25 and 0.50, while the rate of polymerization was somewhat reduced at the ratio of 1.00. It will further be noted from Run 7 that both catalyst components must be present during the heating stage. In Run 8 very good polymerization results were obtained at 200° C. rather than the 150° C. adopted in most trials.

*Table 3*

Catalyst:
  Metal Oxide(s) ---------------------------------- gram -- 10
  $CaH_2$ ---------------------------------------- gram -- 2.5

| Run | Oxide | Surface Area, m.²/g. | Solid Polyethylenes, g. |
|---|---|---|---|
| 2 | $Al_2O_3$ | 350 | 11.0 |
| 9 | $SiO_2$—$Al_2O_3$ [1] | 675 | 2.0 |
| 10 | $TiO_2$ | 70 | 10.0 |
| 11 | $SiO_2$ | 350 | 0.0 |

[1] 15 wt. percent $Al_2O_3$, 85 wt. percent $SiO_2$.

The catalyst preparations of Table 3 were carried out at 550° C. and 2 hours. It will be noted from Table 3 that titania produced a desirable catalyst. However, an acidic silica-alumina functions poorly and silica did not produce a catalyst at all.

The polymers of the present invention can be used or treated as the polymers whose preparation is described in U.S. Patent 2,691,647.

Having described our invention, we claim:

1. A process for the polymerization of an olefin selected from the group consisting of ethylene and propylene which comprises exposing said olefin under polymerization conditions to a catalyst consisting solely of calcium hydride and a non-acidic metal oxide having a surface area of between about 50 and about 500 square meters per gram selected from the class consisting of titania, alumina and mixtures thereof, said catalyst being prepared by heating a mixture of said hydride and said oxide in a weight ratio between about 0.15 and 1.0 at a temperature within the range of about 500° C. to about 700° C. for at least 2 hours in an inert atmosphere.

2. The process of claim 1 wherein said olefin is ethylene and the polymerization product comprises a normally solid hydrocarbon material.

3. The process of claim 1 wherein said olefin is ethylene, and said oxide is an activated alumina.

4. A catalytic composition active for the polymerization of normally gaseous normal alkenes to form resinous polymers, said composition being prepared by contacting a mixture consisting solely of calcium hydride and a non-acidic metal oxide having a surface area of between about 50 and about 500 square meters per gram selected from the class consisting of titania, alumina and mixtures thereof in a weight ratio between about 0.15 and 1.0 at a temperature between about 500° C. and about 700° C. for at least about 2 hours in an inert atmosphere.

5. The composition of claim 4 wherein said metal oxide is activated alumina.

6. The composition of claim 4 wherein said metal oxide is titania.

References Cited in the file of this patent

UNITED STATES PATENTS

| | | |
|---|---|---|
| 2,731,452 | Field et al. | Jan. 17, 1956 |
| 2,773,053 | Field et al. | Dec. 4, 1956 |
| 2,854,496 | Wright | Sept. 30, 1958 |